United States Patent [19]

Sparling

[11] 4,215,947
[45] Aug. 5, 1980

[54] SKI SERVICING AND REPAIRING TOOL

[76] Inventor: James D. Sparling, 1680 Adams St., Apt. #1, Denver, Colo. 80206

[21] Appl. No.: 877,857

[22] Filed: Feb. 15, 1978

Related U.S. Application Data

[62] Division of Ser. No. 663,973, Mar. 4, 1976, Pat. No. 4,089,076.

[51] Int. Cl.$^2$ ............................................. A63C 11/08
[52] U.S. Cl. ................................. 401/125; 401/131; 401/1; 401/118; 222/113; 222/146 H; 219/385; 248/676; 118/64; 126/239; 126/343.5 A
[58] Field of Search .................. 401/1, 2, 131, 118, 401/119, 125; 222/113, 146 R, 146 H, 146 HA, 146 HE, 146 HS; 248/676; 118/64, 410; 219/385; 126/239, 240, 343.5 A, 343.5 R; 30/172; 280/11.37 T

[56] References Cited

U.S. PATENT DOCUMENTS

| | | | |
|---|---|---|---|
| 364,691 | 6/1887 | Wallace | 401/1 |
| 2,246,080 | 6/1941 | Tullis | 126/239 |
| 2,639,658 | 5/1953 | Biehls | 401/1 |
| 3,029,330 | 4/1962 | Ohnstad | 219/385 |
| 3,158,148 | 11/1964 | Utley | 126/343.5 A |
| 3,301,060 | 1/1967 | Kenmotsu | 401/2 |
| 3,367,322 | 2/1968 | Koenig | 126/343.5 A |
| 3,727,704 | 3/1973 | Silverthorne | 219/385 |
| 3,737,627 | 6/1973 | Willard et al. | 219/385 |
| 3,752,155 | 8/1973 | Blinoff, Jr. et al. | 401/1 |
| 3,968,345 | 7/1976 | Kollmeder | 401/1 |
| 4,065,214 | 12/1977 | Daum et al. | 401/2 |

FOREIGN PATENT DOCUMENTS

| | | | |
|---|---|---|---|
| 2447301 | 4/1976 | Fed. Rep. of Germany | 280/11.37 T |
| 18795 | of 1900 | United Kingdom | 401/1 |

*Primary Examiner*—William Pieprz
*Attorney, Agent, or Firm*—Colton & Stone, Inc.

[57] ABSTRACT

A tool assembly is provided for maintaining and repairing the runner surfaces and edges of skis. The basic unit of the assembly is a hand held tool to which blades may be attached for planing or scraping the running surface and longitudinal center groove of the ski. The basic unit also has provisions for mounting a flat file to file and sharpen the metal edges of the skis. A waxing attachment for applying a uniform wax coating to the ski is also provided along with a polishing unit. The assembly further includes a base and heater with a wax reservoir.

6 Claims, 20 Drawing Figures

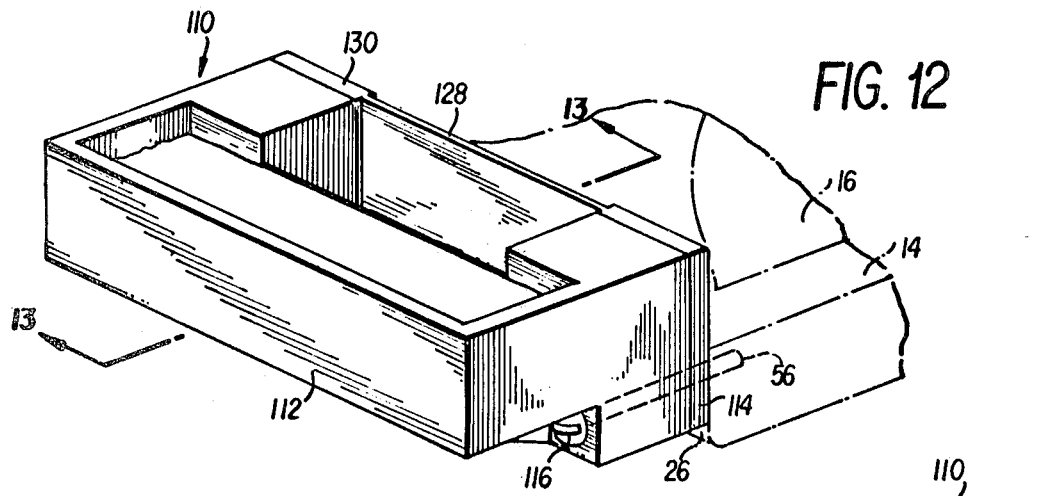
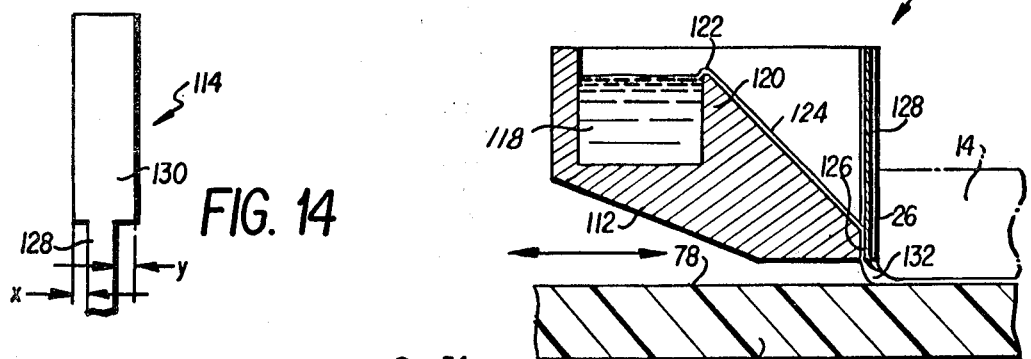
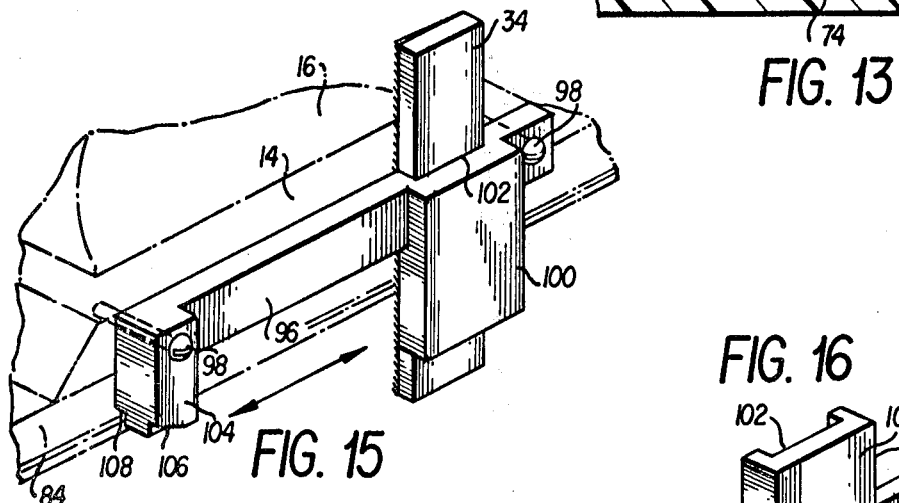
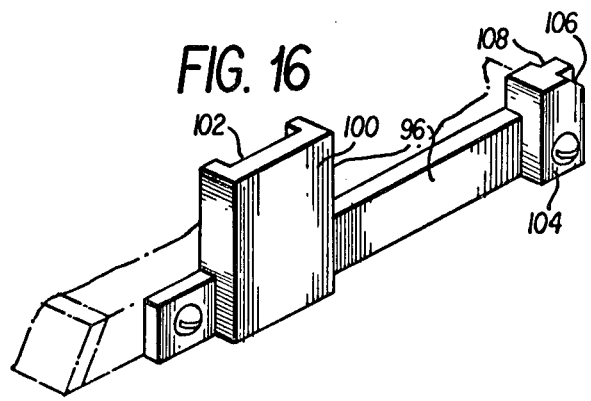
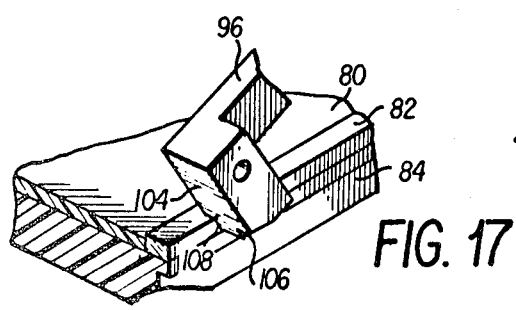

SKI SERVICING AND REPAIRING TOOL

This is a division of application Ser. No. 663,973, filed Mar. 4, 1976, now U.S. Pat. No. 4,089,076, granted May 16, 1978.

BACKGROUND OF THE INVENTION

The present invention relates to a tool assembly for servicing and repairing skis and, more particularly, to such an assembly which, while being compact and readily portable, is capable of performing all of the operations involved in the maintenance of the running surfaces and edges of skis.

Modern skis typically have plastic faced bottom surfaces with metal strips along the lateral edges thereof. During use, these surfaces and edges become nicked and scratched, impairing the user's speed and control. In order to properly maintain skis so as to obtain good performance therefrom, a number of operations need to be performed, including sharpening of the metal edges by filing both the bottom and lateral edges of the metal strips, planing or scraping of the plastic running surface to remove excess plastic and old or excess wax, and rewaxing by applying a coating of hot wax to the running surface and polishing the coating by use of a block of cork. Numerous devices have been designed to perform one or more of these operations. Typical devices of the prior art are shown in U.S. Pat. Nos. 3,045,639; 3,136,659; 3,831,235 and 3,875,825; Austrian Pat. Nos. 102,121 and 200,485; German Pat. Nos. 463,052; 723,265 and 960,164; and Swiss Pat. Nos. 86,396; 88,916; 179,792 and 425,577. No single device is provided in the prior art, however, which is capable of performing all of the operations involved in maintaining the running surfaces and edges of skis so that it is necessary for the ski enthusiast to purchase several expensive pieces of equipment if he wishes to maintain his skis himself. Also, many of the prior art devices are large and, thus, not readily portable.

The primary object of the invention is the provision of a tool which, by the use of interchangeable elements or subassemblies, may be used to perform all of the operations required to maintain the running surfaces and edges of skis.

Another object of the invention is the provision of a ski repairing and servicing tool which is sufficiently compact as to be readily portable.

Yet another object of the invention is the provision of a ski repairing and servicing tool which is of durable construction and which may be manufactured and sold at a reasonable cost so as to be affordable by individual ski enthusiasts.

BRIEF SUMMARY OF THE INVENTION

The above and other advantages of the invention which will become apparent hereinafter are achieved by the provision of a ski servicing and repair tool which includes a basic unit having a base plate and a handle, the handle being shaped so as to fit comfortably in the palm of the user's hand and the base plate having longitudinal and transverse grooves in its bottom surface, an inclined front end and a plurality of mounting holes for attaching ski servicing components. These components include a reversible planing blade adapted to be mounted on the inclined front end of the base plate, a ski center groove scraping blade fitting into the longitudinal groove of the base plate, a guide and clamp unit attachable to the side of the base plate, a wax dispensing assembly also mountable on the base plate, and a cork pad which covers the base plate and is used to polish the waxed ski. The tool assembly also includes a base and heater unit.

For a more complete understanding of the invention and the objects and advantages thereof, reference should be had to the following detailed description and the accompanying drawings wherein there is shown a preferred embodiment of the invention.

BRIEF DESCRIPTION OF THE DRAWINGS

In the drawings:

FIG. 12 is a perspective view of the wax dispensing subassembly;

FIG. 13 is a longitudinal sectional view taken along the line 13—13 of FIG. 12;

FIG. 14 is a fragmentary plan view of the metering plate forming a part of the wax dispensing subassembly;

FIG. 15 is a fragmentary perspective view showing a file holding clamp attached to the mounting plate for edge filing of a ski;

FIG. 16 is a fragmentary perspective view similar to that of FIG. 15 showing the clamp in its storage position;

FIG. 17 is a fragmentary perspective view showing the use of the clamp of FIGS. 15 and 16 as an edge wax scraper;

DETAILED DESCRIPTION OF THE PREFERRED EMBODIMENT

Figure 1:
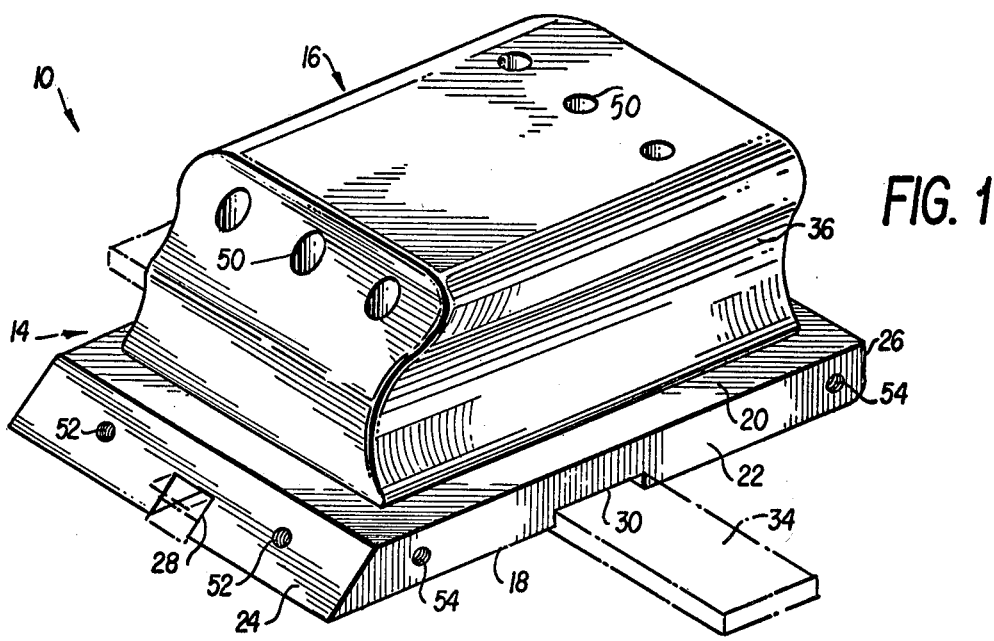
FIG. 1 is a perspective view of the handle and mounting plate assembly of the ski servicing tool.
Figure 3:
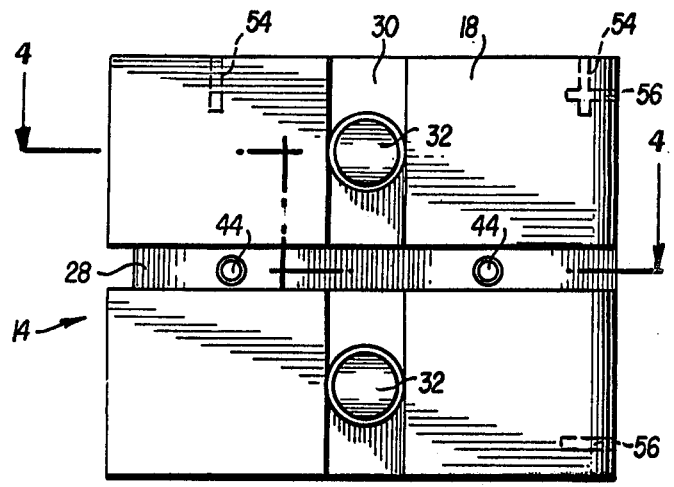
FIG. 3 is a bottom plan view of the handle and mounting plate assembly.
Figure 4:
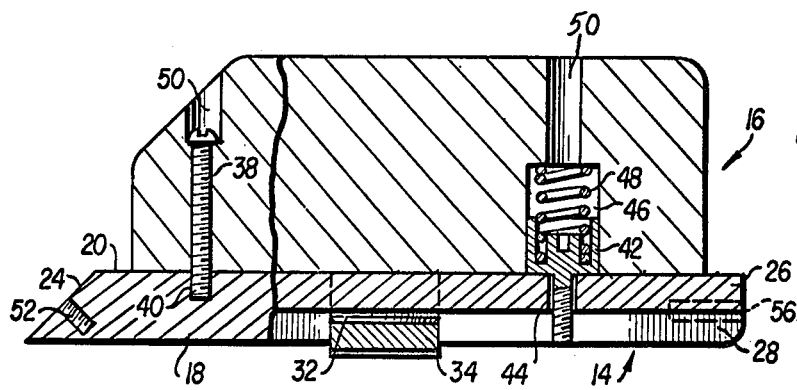
FIG. 4 is a longitudinal sectional view taken along the line 4—4 of FIG. 3.
Figure 2:
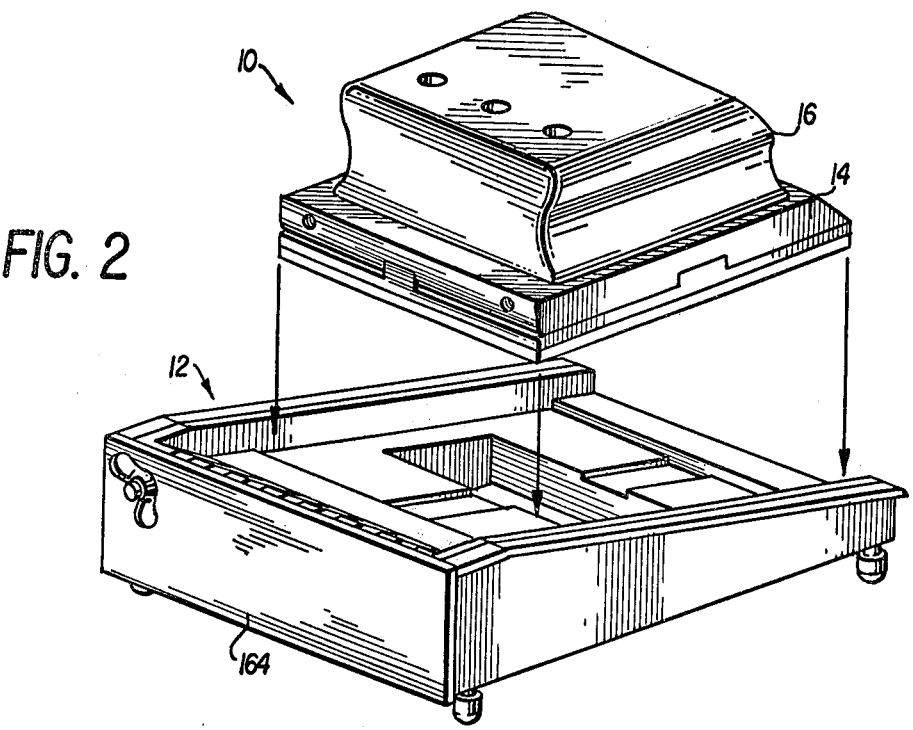
FIG. 2 is an exploded perspective view showing the cooperative relationship of the handle and mounting plate assembly.

The handle and mounting plate assembly of the ski servicing device is designated generally by the reference numeral 10 and is illustrated in FIGS. 1, 3 and 4. The assembly 10 includes a base plate 14, preferably an aluminum plate, and a hand grip 16 which may be a molded plastic member. The base plate 14 has a bottom surface 18, top surface 20, vertical sides 22, an inclined front edge 24 and a rear edge 26. Longitudinal and transverse grooves 28 and 30, respectively, are formed in the bottom surface 18 of the plate 14. As will be discussed in greater detail hereinafter, these grooves receive and properly align various subassemblies used to service and repair the skis. A pair of permanent magnets 32 are embedded in the plate 14, the exposed faces of the magnets being flush with the bottom surface of the transverse groove 30. The hand grip 16, which, preferably, has curved sides 36 to fit comfortably in the palm of the hand, is secured to the top surface 20 of the base plate 14 by means of four screws 38 threaded into holes 40 in the plate. A pair of accessory securing screws 42 are provided, the screws extending through holes 44 in the base plate 14 into the longitudinal groove 28. The screws 42 are captive, being retained in bores 46 extending upwardly into the hand grip 16. Coil springs 48 bias the screws downwardly and access holes 50 extend upwardly to the top surface of the hand grip 16 so that the screws 42 may be engaged by a screwdriver. The inclined front face 24, one side face 22 and the rear face 26 of the mounting plate 14 are each provided with a pair of threaded holes 52, 54, 56, respectively. As will become apparent below, these threaded holes provide attachment points for components of the ski servicing tool.

Figure 5:
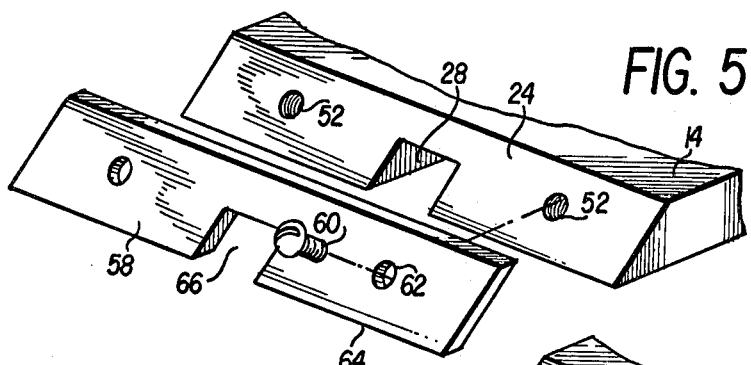
FIG. 5 is a fragmentary, exploded perspective view showing the manner of attachment of a planing blade to the mounting plate.

Referring now to FIG. 5, a removable blade 58 is shown. The blade 58 is attached to the inclined front face 24 of the base plate 14 by screws 60 passing through holes 62 in the blade and threaded into the tapped holes 52 of the base plate. The blade preferably is a high carbon, hardened steel blade and has a sharpened edge 64 and a notch 66 which, when the blade is mounted on the base plate 14, aligns with the end of the longitudinal groove 28. The blade is employed to scrape old wax or excess wax from the running surface of a ski and to remove excess plastic from the running surface when repairing the ski. The planing or scraping is accomplished by holding the assembly 10 so that the base plate 14 is at an angle of approximately 30° to the running surface of the ski and pushing the tool lengthwise along the ski while applying moderate pressure.

Figure 6:
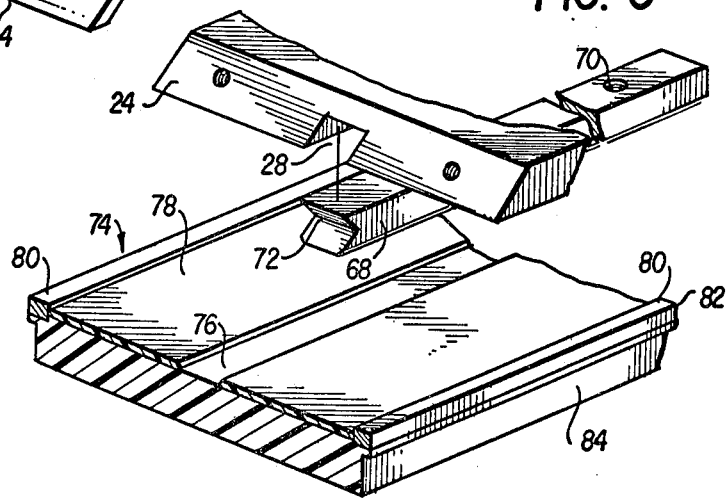
FIG. 6 is a fragmentary, exploded perspective view showing the manner of attachment of a ski center groove scraping tool to the mounting plate and the relationship between the tool and a ski.
Figure 8:
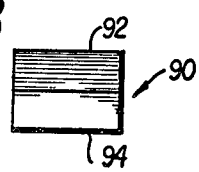
FIGS. 7 and 8 are end elevational views of two embodiments of the groove scraping tool.
Figure 7:
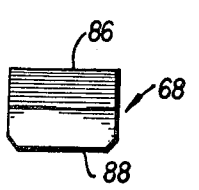
Figure 9:
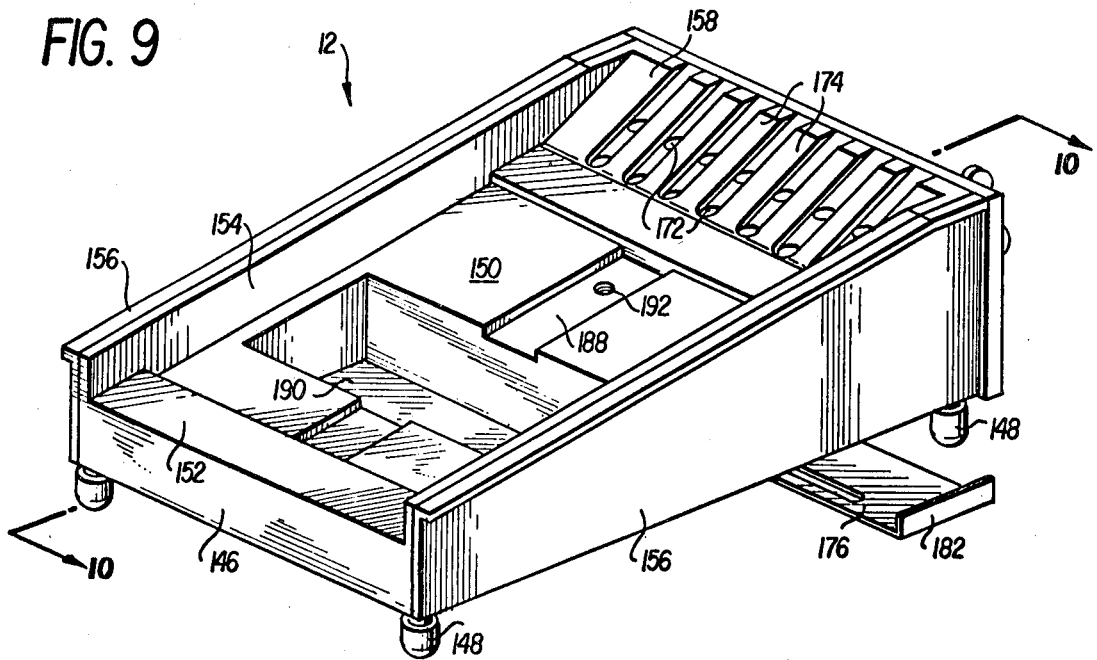
FIG. 9 is a perspective view of the base and heater assembly.

A reversable center blade 68, shown in FIGS. 6 and 7, is received in the longitudinal groove 28 of the base plate 14, being retained by the spring loaded accessory mounting screws 42 which engage threaded holes 70 in the blades. The height and width of the blade 68 are equal to the depth and width, respectively, of the groove 28 and, as can be clearly seen in FIG. 7, the upper surface 86 has right angled edges while the lower surface 88 has beveled edges so as to be of complimentary configuration to the beveled center groove 76 of the ski. When the blade 68 is used to scrape the center groove 76 of the ski, the screws 42 are only partially threaded into the holes 70 so that the springs 48 bias the blade 68 downwardly. During scraping or planing of the principal running surface 78 of the ski, the blade 68 is reversed and the screws 42 tightened completely so that the surface 86 of the blade 68 is flush with the lower surface 18 of the base plate 14. The forward edge of the blade 68 is notched, as indicated at 72, to provide cutting edges. FIG. 8 illustrates a modified form of the center blade intended for use with skis in which the center grooves of the skis have perpendicular rather than slanted side walls. As can be seen from this figure, the blade 90 has right angled edges on both the upper and lower surfaces 92 and 94. In addition to the scraping function, the center blade, when mounted in its floating position, also serves to guide the tool 10 as it is moved along the ski.

The basic tool 10 may be also used as a sanding block, for example, for sanding the running surface 78 of the ski following repairs to the plastic material forming this surface. To acomplish this, the screws 38 securing the handle 16 to the base plate 14 are loosened and the opposite edges of a piece of sandpaper extending across the bottom of the base plate 14 are folded over the sides of the base plate and clamped between the top surface thereof and the bottom surface of the handle.

The use of the ski servicing tool for edge filing of the ski is shown in FIGS. 1, 4 and 15. As was discussed above, the base plate 14 has a pair of permanent magnets 32 embedded in the base of the transverse groove 30. These magnets serve to retain a flat file 34 in the groove 30. In order to assure that the file 34 remains at right angles to the longitudinal axis of the ski during the filing operations, a combined guide and clamp 96 is attached to the side of the base plate 14, screws 98 being threaded into the holes 54 to retain the clamp in place. The clamp 96 has a pair of legs 100, 104 which, when the clamp is mounted as shown in FIG. 15, project below the base plate 14 and bear against the lateral edge 84 of the ski. In order to file the bottom portions 80 of the metal edges of the ski, the tool 10 with the flat file 34 positioned in the transverse groove 30 is drawn along the length of the ski, the legs 100, 104 of the clamp and guide 96 serving to maintain the file at right angles to the longitudinal axis of the ski. The clamp 96 is also employed for filing the lateral edges 84 of the ski and for this purpose one of the legs 100 is enlarged and has a groove 102. Filing of the lateral edges 84 is accomplished by removing the file 34 from the base plate 14 and inserting it in the groove 102 of the clamp 96. The clamp holding screws 98 are subsequently tightened, thereby clamping the file in position. The tool is then moved longitudinally along the ski as indicated by the two-headed arrow of FIG. 15. As a result of the bottom and lateral edge filing, the edges 82 of the ski are sharpened and the bottom metal surface 80 and lateral metal surfaces 84 are smoothed, burrs, nicks and scratches being removed by the filing operation.

A waxing attachment 110 is shown in FIGS. 12–14. The attachment 110 includes a body portion 112 and a metering plate 114 and is attached to the rear face 26 of the base plate 14 by means of screws 116 threaded into the tapped holes 56. The body portion 112 is preferably formed of aluminum and is of sufficient mass as to retain a quanitity of heat. A well 118 is provided in the body portion and serves as a reservoir for molten wax. The forward wall 120 of the well 118 is of lessor height than the other walls, terminating with a lip 122. The opposite face 124 of the wall 120 slants downwardly from the lip 122. The center portion 128 of the metering plate 114 adjacent the wall face 124 is of lesser thickness than the lateral portions 130 of the metering plate to provide a slot 126 between the body portion 112 and the metering plate 114. As can be seen from FIG. 14, the center portion 128 of the metering plate is offset from the centerline of the plate, being spaced from one side face by a first distance x and from the opposite side face by a greater second dimension y. The orientation of the metering plate 114 relative to the body portion 112 thus determines the width of the wax dispensing slot 126. Wax is applied to the running surface of the ski by first tilting the tool 10 with the waxing attachment 110 secured thereto so that a quantity of molten wax flows over the lip 122 and downwardly along the slanted wall face 124 to the slot 126. As the tool is moved along the surface of the ski 74, a thin stream or film of wax 132 is deposited on the running surface of the ski. As will be discussed in greater detail below, the base plate 14 is preheated for the waxing operation and aids in the even dispersal of the wax onto the ski running surface 78.

Figure 18:
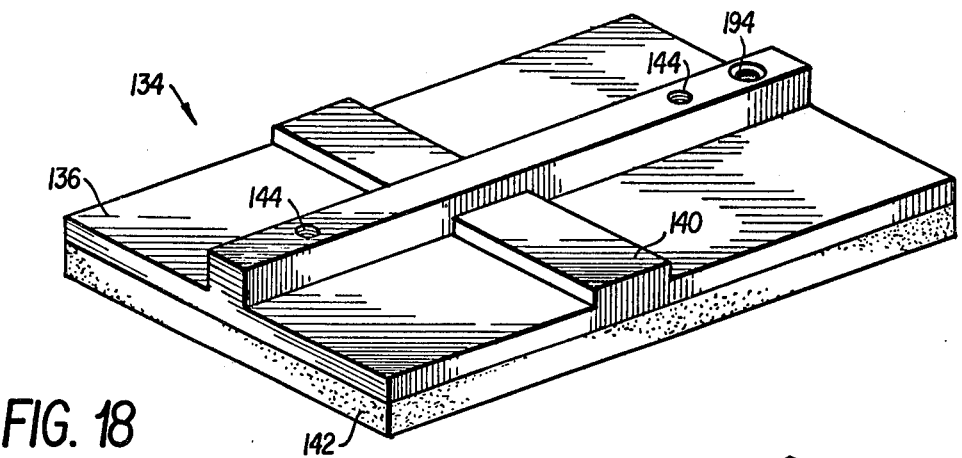
FIG. 18 is a perspective view of a cork pad attachment.

When a coating of wax has been applied to the running surface of the ski, the wax is polished to provide a smooth surface. This is accomplished by the use of the cork polisher attachment 134 illustrated in FIG. 18. The polisher attachment consists of a metal plate 136 of the same length and width as the base plate 14 of the tool 10 and having longitudinal and transverse lands 138 and 140, respectively, which are of complimentary configuration to the longitudinal and transverse grooves 28 and 30, respectively, of the base plate 14 and a pad 142 of cork or the like adhesively bonded to the lower surface of the plate 136. A pair of threaded holes 144 are provided in the longitudinal land 138 for receiving the accessory securing screws 42 of the tool 10.

Figure 19:
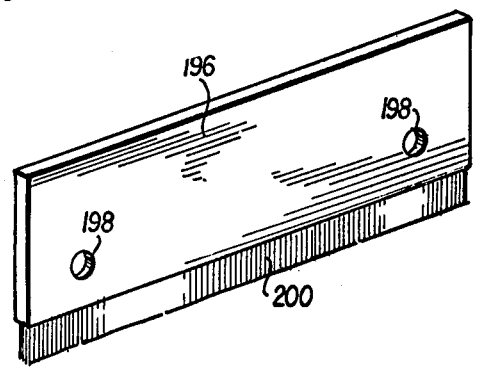
FIG. 19 is a perspective view of a brush plate.
Figure 20:
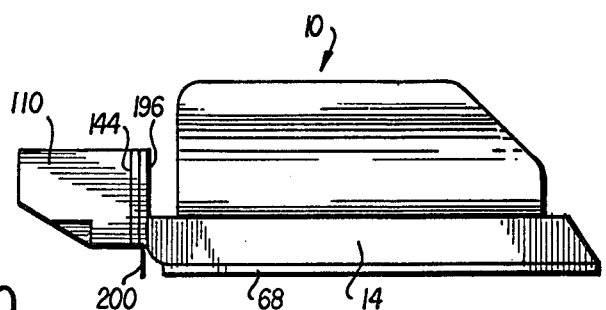
FIG. 20 is a side elevational view illustrating the use of the brush plate in conjunction with the wax dispensing subassembly.

With some snow conditions, it is preferably that the wax coating on the skis have a coarse grained surface. This wax surface is obtained by the use of the brush plate 196 illustrated in FIGS. 19 and 20. The plate 196 has a pair of mounting holes 198 and downwardly projecting bristles 200. In use, the plate 196 is sandwiched between the base plate 14 of the tool 10 and the metering bristles 200 extend downwardly into contact with the running surface 78 of the ski immediately adjacent the slot 126 through which the molten wax flows onto the ski.

Since it is preferable that the edges 82 of the ski be free of wax, means are provided for scraping the wax from these edges following the ski waxing and polishing operations. As can be seen from FIGS. 15 and 17, the shorter leg 104 of the guide and clamp 96 is provided with a pair of 30° notches 106 and 108 at its outer end. In order to remove wax from the ski edges 82, the guide and clamp 96, detached from the tool 10 and held in the hand, is drawn lightly along the ski edge in the manner shown in FIG. 17, that is, with one of the notches 106, 108 engaging the edge 82.

As was discussed above, the wax applying operation involves the use of molten wax. In order to maintain a supply of molten wax, it is necessary that the waxing attachment 110 be heated to a temperature sufficient to assure that the wax in the well 118 is melted and remains so during the application process. The base plate 14 of the tool 10 is also heated to aid in the dispersal of wax onto the ski. In FIGS. 2 and 9–11 there is illustrated a heater unit 12 on which the tool 10 and waxing attachment 110 are placed to effect the heating of these components. The heater unit 12 has a generally wedge-shaped metal block 146, preferably aluminum for high heat conductivity, having four insulated feet 148 to protect the surface on which the unit 12 is placed. The upper face of the block 146 has a slanted portion 150 of generally the same dimensions as the base plate 14 of the tool 10, the lower end of the portion 150 terminating in a raised lip 152 to prevent the tool 10 from sliding off the base 12. The block 146 also has raised side walls 154, the exterior faces of which are covered with plastic panels 156 providing insulation so that the heater may be handled while in use. The thicker end 158 of the block 146 beyond the upper end of the slanted portion 150 is hollowed out to provide a chamber 160 extending inwardly from the end face of the block. This chamber is of sufficient size as to receive a heat source 162 which preferably is a small quantity of gelled alcohol such as that sold under the trademark Sterno (a register trademark of Sterno, Inc., New York, N.Y.). A closure panel 164 is attached to the end face of the block 146 by a threaded stud and wing nut 166. The closure panel 164 has a raised portion 168 which projects a short distance into the chamber 160. Access to the chamber 160 is obtained by loosening the wing nut 166 sufficiently to permit the panel 164 to be moved away from the block 164 until the projecting portion 168 is clear of the chamber walls after which the panel is swung upwardly.

Combustion air enters the chamber 160 through an opening 170 extending upwardly from the bottom face of the block 146. A plurality of vent holes 172 extend upwardly from the chamber 160, opening into parallel channels 174 formed in the inclined upper face of the portion 158. In order to regulate the amount of air admitted to the chamber 160, a sliding gate 176 is provided, the gate being mounted on the bottom face of the block 146 by means of screws 178 extending through an elongated slot 180 in the gate. The outer end of the gate has an upwardly projecting flange 182 providing a convenient handle. As can be seen from FIG. 11, the gate is slideable so as to fully or partially close the air inlet opening 170. Both the inner end of the opening 170 and the lower ends of the vent holes 172 are covered by a wire screen or mesh 184 secured within the chamber 160 by screws 186. Should the heater unit 12 be accidentially upset while the fuel within the chamber 160 is burning, the screen or mesh 184 prevents fuel from escaping from the chamber. During normal operation of the heater, the mesh 184 assures that only heated gases escape from the chamber.

To complete the description of the heater and base unit 12, it should be noted that the slanted portion 150 has a central groove 188 extending the length thereof and that a large recess or well 190 is provided generally in the mid-portion of the block 146. The groove 188 provides clearance for the center blade 68 so that the base plate 14 of the tool 10 rests directly on the slanted surface 150. The well 190 serves to reduce the total weight of the unit 12 and provides a reservoir for additional wax to replenish the waxing accessory well 118.

Figure 10:
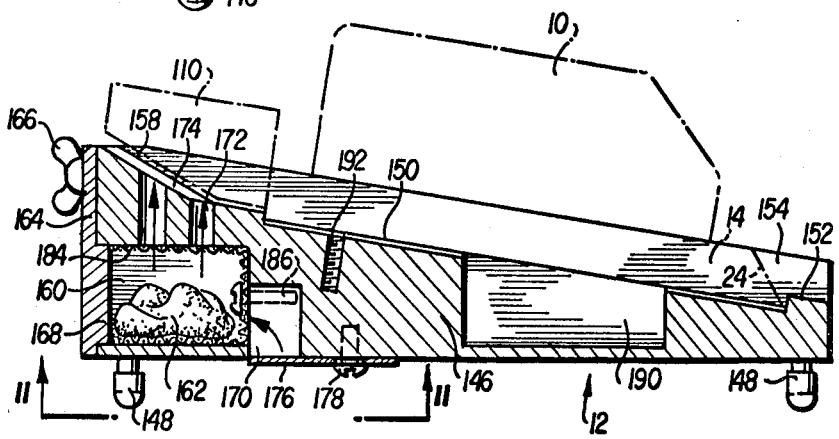
FIG. 10 is a longitudinal sectional view taken along the line 10—10 of FIG. 9.
Figure 11:
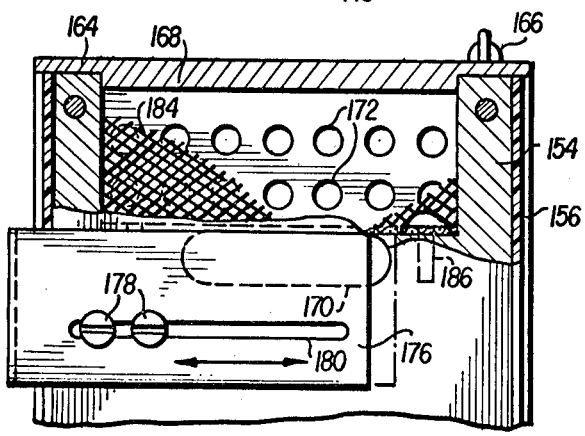
FIG. 11 is a fragmentary bottom plan view of the base and heater assembly, the view being taken along the plain designated 11—11 in FIG. 10 and having portions of the assembly broken away for clarity.

As can be seen from FIG. 10, heating of the tool 10 preparatory to the ski waxing operation is accomplished by placing the tool with the waxing accessory 110 attached on the heater unit 12, the base plate 14 resting on the slanted surface 150 and the waxing accessory 110 overlying the vent holes 172. The raised lip 152 at the lower end of the surface 150 engages the foreward end 24 of the base plate 14 to prevent the tool from sliding off the unit 12. The vent channels 174 assure that the vent holes 172 are not blocked by the bottom of the waxing accessory 110. Heated gases raising through the vent holes 172 and channels 174 directly heat the body portion 112 of the waxing accessory. Heat is also supplied to the base plate 14 by conduction through the body 146 of the heater unit 12.

When carrying or storing the device, it is desirable to have a minimum of separate pieces which must be handled. For this purpose, a threaded hole 192 is provided in the heater unit 12 and a countersunk through hole 194 is provided in the corking attachment 134 for receiving a screw (not shown) to secure the corking attachment to the heater unit 12 after which the tool 10 is secured to the corking attachment 134 by means of the spring loaded screws 42. At this time, the waxing attachment may also be connected in its normal position on the base plate 14 and, as can be seen from FIG. 16, the guide and clamp 96 can be attached in a reversed position to the side of the base plate 14.

In addition to the waxing operation described above, the tool of the present invention is also useful in effecting repairs to the plastic running surface of the ski. The repair operation is initiated by scraping the old wax from the surface 78 and the groove 76 of the ski, using the planing blade 58 and center blade 68 as discussed above. When the ski has been cleaned of old wax, plastic material is added to fill the dents and scratches after which the tool 10 with the planing blade 58 attached is again run along the ski to remove excess plastic material. When the running surface 78 of the ski has been restored to a flat condition, the center blade 68 is employed to remove any excess plastic from the groove 76, thus restoring the groove contour. A sanding operation may follow, using fine sandpaper or emery cloth attached to the base plate 14 in the manner described above. The filling and waxing operations detailed above complete the repair sequence.

While a preferred embodiment of the invention has been described in detail above, the invention is not necessarily limited to the described embodiment. Rather, reference should be had to the following claims in determining the true scope of the invention.

What is claimed is:

1. A device for supporting and heating a ski servicing tool of the type having a base plate with a substantially planar lower surface, a handle attached to said base plate, and a wax dispenser extending laterally from one edge of said base plate and including a reservoir for wax, said device comprising:
    a support base including an inclined supporting surface adapted to receive said base plate with said wax dispenser projecting beyond the upper edge of said surface, said support base also including upwardly extending walls adjacent the lower edge and each side of said surface; and
    a lateral extention of said base housing a heat source and located adjacent to the upper edge of said surface so as to underly said wax dispenser when said tool is positioned on said support base.

2. The device of claim 1 wherein said support base includes a well extending downwardly from said supporting surface, said base being formed of a thermally conductive material whereby heat from said source is transmitted to said well.

3. The device of claim 1 wherein said extension has a chamber for receiving a supply of fuel, an air inlet to said chamber and a plurality of exhaust vents leading from said chamber to an area closely adjacent said wax dispenser.

4. The device of claim 3 wherein said extension has an access opening leading to said chamber and an openable cover for said access opening.

5. The device of claim 3 including gate means for said air inlet.

6. The device of claim 1 wherein said support base is formed of a material having good thermal conductivity whereby heat from said heat source is conducted to said tool base plate.

* * * * *